United States Patent
Varekamp et al.

(10) Patent No.: US 11,694,390 B2
(45) Date of Patent: Jul. 4, 2023

(54) APPARATUS AND METHOD FOR GENERATING IMAGES OF A SCENE

(71) Applicant: KONINKLIJKE PHILIPS N.V., Eindhoven (NL)

(72) Inventors: Christiaan Varekamp, Veldhoven (NL); Patrick Luc Els Vandewalle, Oud-Turnhout (BE)

(73) Assignee: Koninklijke Philips N.V., Eindhoven (NL)

(*) Notice: Subject to any disclaimer, the term of this patent is extended or adjusted under 35 U.S.C. 154(b) by 182 days.

(21) Appl. No.: 17/254,903

(22) PCT Filed: Jun. 20, 2019

(86) PCT No.: PCT/EP2019/066311
§ 371 (c)(1),
(2) Date: Dec. 22, 2020

(87) PCT Pub. No.: WO2020/002115
PCT Pub. Date: Jan. 2, 2020

(65) Prior Publication Data
US 2021/0264658 A1 Aug. 26, 2021

(30) Foreign Application Priority Data
Jun. 25, 2018 (EP) .................................. 18179841

(51) Int. Cl.
*G06T 15/20* (2011.01)
*G06T 7/73* (2017.01)
(Continued)

(52) U.S. Cl.
CPC ............... *G06T 15/20* (2013.01); *G06T 7/74* (2017.01); *H04N 13/117* (2018.05); *H04N 2013/0088* (2013.01)

(58) Field of Classification Search
None
See application file for complete search history.

(56) References Cited

U.S. PATENT DOCUMENTS

| 7,692,640 B2 | 4/2010 | Van Geest et al. |
| 7,990,394 B2 | 8/2011 | Luc et al. |

(Continued)

FOREIGN PATENT DOCUMENTS

WO 2018060334 A1 4/2018

OTHER PUBLICATIONS

Huszák Árpád Ed—Xu Zheng et al:"Advanced free viewpoint video streaming techniques", Multimedia Tools and Applications, Kluwer Academic Publishers, Boston, US, vol. 76, No. 1,Nov. 11, 2015 (Nov. 11, 2015), pp. 373-396, XP036161697.
(Continued)

*Primary Examiner* — Steven Z Elbinger

(57) ABSTRACT

An apparatus comprises a store (209) storing a set of anchor poses for a scene, as well as typically 3D image data for the scene. A receiver (201) receives viewer poses for a viewer and a render pose processor (203) determines a render pose in the scene for a current viewer pose of the viewer pose where the render pose is determined relative to a reference anchor pose. A retriever (207) retrieves 3D image data for the reference anchor pose and a synthesizer (205) synthesizes images for the render pose in response to the 3D image data. A selector selects the reference anchor pose from the set of anchor poses and is arranged to switch the reference anchor pose from a first anchor pose of the set of anchor poses to a second anchor pose of the set of anchor poses in response to the viewer poses.

20 Claims, 11 Drawing Sheets

(51) Int. Cl.
　　　*H04N 13/117*　　(2018.01)
　　　*H04N 13/00*　　　(2018.01)

(56) References Cited

U.S. PATENT DOCUMENTS

| | | |
|---|---|---|
| 9,256,926 B2 | 2/2016 | Berretty et al. |
| 9,485,487 B2 | 11/2016 | Kroon |
| 2008/0291217 A1* | 11/2008 | Vincent .................. G06T 19/00 |
| | | 345/629 |
| 2010/0259595 A1* | 10/2010 | Trimeche ........... H04N 21/2365 |
| | | 348/E13.001 |
| 2012/0098820 A1 | 4/2012 | Said |
| 2016/0253809 A1 | 9/2016 | Cole et al. |
| 2016/0379606 A1* | 12/2016 | Kollin .................. G03H 1/0005 |
| | | 345/428 |
| 2018/0025536 A1 | 1/2018 | Bell et al. |
| 2018/0053341 A1* | 2/2018 | Chui ......................... G06T 7/32 |
| 2018/0329215 A1 | 11/2018 | Kale et al. |
| 2019/0272674 A1* | 9/2019 | Comer ................ G06F 3/04815 |
| 2020/0134910 A1 | 4/2020 | Kroon et al. |
| 2020/0396436 A1 | 12/2020 | Bruls et al. |

OTHER PUBLICATIONS

International Search Report and Written Opinion form PCT/EP2019/066311 dated Sep. 12, 2019.

\* cited by examiner

APPARATUS AND METHOD FOR GENERATING IMAGES OF A SCENE

CROSS-REFERENCE TO PRIOR APPLICATIONS

This application is the U.S. National Phase application under 35 U.S.C. § 371 of International Application No. PCT/EP2019/066311, filed on Jun. 20, 2019, which claims the benefit of EP Patent Application No. EP 18179841.4, filed on Jun. 26, 2018. These applications are hereby incorporated by reference herein.

FIELD OF THE INVENTION

The invention relates to an apparatus and method for generating images for a scene and in particular, but not exclusively, to generation of images for a virtual reality application accessing a virtual scene.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in that they are based on a predetermined model of the scene, and typically on an artificial model of a virtual world. It would be desirable if a virtual reality experience could be provided based on real world capture. However, in many cases such an approach is very restricted or tends to require that a virtual model of the real world is built from the real world captures. The virtual reality experience is then generated by evaluating this model.

However, the current approaches tend to be suboptimal and tend to often have a high computational or communication resource requirement and/or provide a suboptimal user experience with e.g. reduced quality or restricted freedom.

As an example of an application, virtual reality glasses have entered the market. These glasses allow viewers to experience captured 360 degree (panoramic) or 180 degree video. These 360 degree videos are often pre-captured using camera rigs where individual images are stitched together into a single spherical mapping. Common stereo formats for 180 or 360 video are top/bottom and left/right. Similar to non-panoramic stereo video, the left-eye and right-eye pictures are compressed as part of a single H.264 video stream. After decoding a single frame, the viewer rotates his/her head to view the world around him/her. An example, is a recording wherein viewers can experience a 360 degree look-around effect, and can discretely switch between video streams recorded from different positions. When switching, another video stream is loaded, which interrupts the experience.

One drawback of the stereo panoramic video approach is that the viewer cannot change position in the virtual world. Encoding and transmission of a panoramic depth map besides the panoramic stereo video could allow for compensation of small translational motions of the viewer at the client side but such compensations would inherently be limited to small variations and movements and would not be able to provide an immersive and free virtual reality experience.

A related technology is free-viewpoint video in which multiple view-points with depth maps are encoded and transmitted in a single video stream. The bitrate of the video stream could be reduced by exploiting angular dependencies between the view-points in addition to the well-known temporal prediction schemes. However, the approach still requires a high bit rate and is restrictive in terms of the images that can be generated. It cannot practically provide an experience of completely free movement in a three-dimensional virtual reality world.

Unfortunately, none of the prior-art technologies can deliver an ideal experience but often tend to be restrictive in the freedom of the changes in the positions and viewing directions. In addition, the technologies tend to require a very high data rate and provide data streams that include more data than is necessary for the generation of the individual images/views.

Indeed, although the number and variation in virtual reality services and applications is increasing, it would still be desirable to provide improved user experiences. It would in particular be desirable to provide more flexible and intuitive user experiences. It is in particular desirable for an application to not only provide a high quality visual response but also for the user control and input being intuitive, natural, flexible, and easy to use.

Hence, an improved approach for generating images for a scene, in particular for a virtual reality experience/application, would be advantageous. In particular, an approach that allows improved operation, increased flexibility, reduced data rates, facilitated distribution, reduced complexity, facilitated implementation, reduced storage requirements, increased image quality, improved and/or facilitated user control, an improved virtual reality experience, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided apparatus for generating images of a scene, the apparatus comprising: a store for storing a set of anchor poses for the scene; a receiver for receiving viewer poses for a viewer; a selector for selecting a reference anchor pose from the set of anchor poses; a render pose processor for determining a first render pose in the scene for a current viewer pose of the viewer poses; a retriever retrieving first three-dimensional image data for the reference anchor pose; a synthesizer for synthesizing an image for the render pose in response to the first three dimensional image data; wherein the selector is arranged to switch the reference anchor pose from a first anchor pose of the set of anchor poses to a second anchor pose of the set of anchor poses in response to a change in the viewer poses meeting a criterion and the render pose processor is arranged to determine the first render pose from a mapping of viewer poses to render poses where the mapping depends on which anchor pose of the set of anchor poses is selected as the reference anchor pose.

The invention may provide improved and/or more useful generation of images of a scene in response to viewer poses for a viewer. The approach may in many embodiments provide image data highly suitable for a flexible, efficient, and high performance Virtual Reality (VR) application. In many embodiments, it may allow or enable an improved VR user experience. In many examples, the approach may provide a user experience where a user may experience natural parallax for small movements yet be able to more drastically change views in order to e.g. look around things. The user may for example experience natural parallax for most movements, yet be able to teleport to a different viewpoint when a different viewpoint is required. Further, the approach may provide advantageous and intuitive user control in many embodiments. For example, the user may be able to control the different experiences and functions based on a natural and simple head movement.

The approach may reduce the complexity of functionality required to provide a desirable e.g. virtual reality experience. For example, a flexible experience may be provided based on only very few cameras capturing the scene. The approach may be highly advantageous for e.g. broadcasts or transmissions of real world events, such as live time transmissions or broadcasts of sports events.

The generated images may correspond to viewport images for the head pose. The images may be generated to form a continuous data stream and may e.g. be a stream of stereo frames corresponding to view images.

The scene may be a virtual scene and may specifically be an artificial virtual scene, or may e.g. be a captured real-world scene, or an augmented reality scene. The viewer poses may represent a pose of a viewer in the real world and may specifically correspond to a head pose of a viewer, such as e.g. detected by a VR headset. The viewer pose may be represented in a real-world coordinate system. The render pose and the anchor poses may be represented in a scene coordinate system.

In some embodiments, the viewer poses, render poses, and/or anchor poses may be viewer positions, render positions, and/or anchor positions, respectively. The anchor poses may be poses for which three-dimensional image data representing the scene is available. Specifically, the anchor poses may be capture poses for the scene (specifically poses for real or virtual cameras capturing the scene).

The selector may be arranged to switch the reference anchor pose from a first anchor pose of the set of anchor poses to a second anchor pose of the set of anchor poses if the viewer poses (a current viewer pose) meet a switch criterion. In some embodiments, the selector may be arranged to switch the reference anchor pose from the first anchor pose of the set of anchor poses to the second anchor pose of the set of anchor poses in response to a change in the viewer poses meeting a criterion.

The specific criterion used will depend on the specific requirements and preferences of the individual embodiments and the desired effects to be achieved. Similarly, the properties of the mapping and how this varies with the anchor pose will depend on the specific requirements and preferences of the individual embodiments and the desired effects to be achieved.

In many embodiments, the mapping may consider no other viewer poses than the current viewer pose whereas the criterion may include a consideration of (requirement involving) at least one viewer pose not being the current viewer pose. Typically, the mapping may include only the current viewer pose whereas the criterion for switching the reference anchor pose may include a consideration of past viewer poses. The criterion may specifically include a hysteresis for the selection of the reference anchor pose. The selection of the anchor pose may depend on a history of the viewer poses whereas the mapping may consider only the current viewer pose.

The mapping may be a one to one mapping. The change in mapping when switching anchor poses may in some embodiments be instantaneous and may in other embodiments be gradual. In some embodiments, the relative mapping for different anchor poses may be such that a relative change in the viewer pose maps to the same relative change in the render pose for different reference anchor poses (i.e. in the absence of a change in the reference anchor pose).

In accordance with an optional feature of the invention, the render pose processor is arranged to map a viewer pose value to different render pose values for the first anchor pose being selected as the reference anchor pose and for the second anchor pose being selected as the reference anchor pose.

This may provide an improved experience and/or performance in many embodiments.

In accordance with an optional feature of the invention, the mapping comprises applying a different offset to the render pose depending on which anchor pose of the set of anchor poses is selected as the reference anchor pose.

This may in many embodiments provide a particularly advantageous operation. In many embodiments, the same relative/differential mapping may be applied for each anchor pose and with a change between anchor poses resulting in a change of a pose offset for the render poses.

In accordance with an optional feature of the invention, the render pose processor is arranged to map viewer poses to render poses for the same reference anchor pose such that a change in the viewer poses in a first direction is mapped to a change in the render poses in the first direction.

This may in many embodiments provide a particularly advantageous operation.

In accordance with an optional feature of the invention, the mapping is a constant linear mapping for a distance from the render pose to the reference anchor pose not exceeding a threshold.

This may in many embodiments provide a particularly advantageous operation, and may in particular allow a natural viewing experience for relatively small changes in viewer pose.

In some embodiments, the mapping may be a constant linear mapping for a distance from the render pose to the reference anchor pose not exceeding a threshold.

In accordance with an optional feature of the invention, the linear mapping has a scale factor of no less than 50% and no more than 150%.

This provide an improved experience and may in particular provide a natural experience yet allow some adaptation in the operation. In many embodiments, the scale factor may be 100% resulting in a more natural experience with natural parallax. The scale factor may reflect a ratio between a pose distance of the viewer pose and the corresponding (mapped) pose distance in the render pose.

In accordance with an optional feature of the invention, the selector is arranged to switch the reference anchor pose in response to a detection that a first viewer pose meets a criterion that comprises a requirement that a first distance between the first viewer pose and a reference viewer pose exceeds a threshold.

This may provide an efficient and intuitive experience yet require only low complexity. The reference viewer pose may specifically be a pose that maps to the reference anchor pose.

In accordance with an optional feature of the invention, the selector is arranged to modify the reference viewer pose depending on which anchor pose of the set of anchor poses is selected as the reference anchor pose.

This may provide an improved experience in many embodiments. It may in particular allow improved control of when to switch reference anchor poses. It may for example allow an approach where different pose regions for the viewer pose maps to different reference anchor poses thereby facilitating control.

In accordance with an optional feature of the invention, the first distance is dependent on which anchor pose of the set of anchor poses is selected as the reference anchor pose.

This may provide improved performance in many embodiments.

In accordance with an optional feature of the invention, the first distance is a distance between a position of the first viewer pose and a position of the reference viewer pose, and the selector is arranged to adapt the threshold dependent on a difference between an orientation of the viewer pose and a reference orientation.

This may provide an improved experience. It may in particular in many embodiments allow an improved adaptation to, and estimation of, whether a user is turning his head or whether he is moving his head to look around e.g. a foreground object.

In accordance with an optional feature of the invention, the threshold is a monotonically increasing function of the difference.

This may provide an improved experience.

In accordance with an optional feature of the invention, the selector is arranged to switch the reference anchor pose in response to a rate of change of the viewer poses.

This may in many scenarios provide an improved experience to a user. For example, the threshold distance required to switch anchor pose may be reduced for an increasing rate of change of an orientation of the viewer poses.

In accordance with an optional feature of the invention, the retriever is further arranged to retrieve second three dimensional image data for a second anchor pose of the set of anchor poses; and the synthesizer is arranged to synthesize the image using the second three dimensional data; where the first three dimensional data has a higher quality level than the second three dimensional data.

This may in many applications allow improved image quality without an undesirably high increase in the data rate.

According to an aspect of the invention there is provided a method of generating images of a scene, the method comprising: storing a set of anchor poses for the scene; receiving viewer poses for a viewer; selecting a reference anchor pose from the set of anchor poses; determining a first render pose in the scene for a current viewer pose of the viewer poses, the first render pose being determined relative to the reference anchor pose; retrieving first three-dimensional image data for the reference anchor pose; synthesizing an image for the render pose in response to the first three dimensional image data; wherein the selection comprises switching the reference anchor pose from a first anchor pose of the set of anchor poses to a second anchor pose of the set of anchor poses in response to a change in the viewer poses meeting a criterion.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
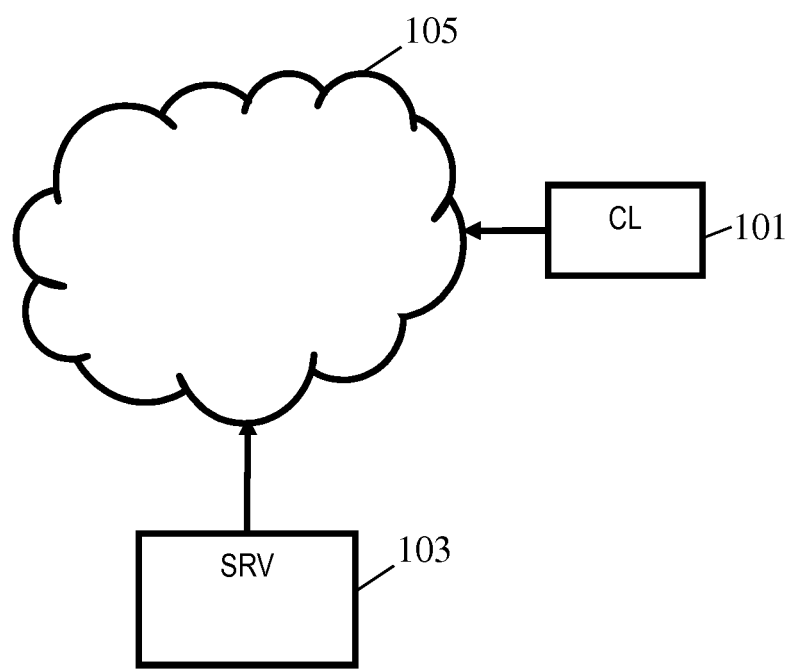
FIG. 1 illustrates an example of client server arrangement for providing a virtual reality experience.

Virtual experiences allowing a user to move around in a virtual world are becoming increasingly popular and services are being developed to satisfy such a demand. However, provision of efficient virtual reality services is very challenging, in particular if the experience is to be based on a capture of a real world environment rather than on a fully virtually generated artificial world.

In many virtual reality applications, a viewer pose input is determined reflecting the pose of a virtual viewer in the virtual scene. The virtual reality apparatus/system/application then generates one or more images corresponding to the views and viewports of the virtual scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, one or more view images may e.g. be presented on an autostereoscopic display, or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset.

In some systems, the viewer pose may be provided by manual means, e.g. by the user manually controlling a joystick or similar manual input. For example, the user may manually move the virtual viewer around in the virtual scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In some applications, a full three-dimensional model may be provided for the scene and the views of the scene from a specific viewer pose can be determined by evaluating this model. In other systems, the virtual scene may be represented by image data corresponding to views captured from different capture poses. For example, for a plurality of capture poses, a full spherical image may be stored together with three dimensional (depth data). In such approaches, view images for other poses than the capture poses may be generated by three dimensional image processing, such as specifically using view shifting algorithms. In systems wherein the scene is described/referenced by view data stored for discrete view points/positions/poses, these may also be referred to as anchor view points/positions/poses. Typically when a real world environment has been captured by capturing images from different points/positions/poses, these capture points/positions/poses are also the anchor points/positions/poses.

A typical VR application accordingly provides (at least) images corresponding to viewports for the virtual scene for the current viewer pose with the images being dynamically updated to reflect changes in the viewer pose and with the images being generated based on data representing the virtual scene/environment/world.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A system or entity based on providing the maximum degree of freedom for the viewer is typically referred to as having 6 Degrees of Freedom (6DoF). Many systems and entities provide only an orientation or position and these are typically known as having 3 Degrees of Freedom (3DoF).

In some systems, the VR application may be provided locally to a viewer by e.g. a stand alone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene data. The view images are then transmitted to the device local to the viewer where they are presented. For example, the remote device may directly generate a video stream (typically a stereo/3D video stream) which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate viewer poses that are continuously transmitted to the remote VR device. The remote VR device may then generate the corresponding view images and transmit these to the local device for presentation. In other systems, the remote VR device may not directly generate the view images but may select relevant scene data and transmit this to the local device which may then generate the view images that are presented. For example, the remote VR device may identify the closest capture point and extract the corresponding scene data (e.g. spherical image and depth data from the capture point) and transmit this to the local device. The local device may then process the received scene data to generate the images for the specific, current view pose.

FIG. 1 illustrates such an example of a VR system in which a remote VR server 103 liaises with a client VR device 101 e.g. via a network 105, such as the Internet. The remote VR server 103 may be arranged to simultaneously support a potentially large number of client VR devices 101.

Such an approach may in many scenarios provide an improved trade-off e.g. between complexity and resource demands for different devices, communication requirements etc. For example, the viewer pose and corresponding scene data may be transmitted with larger intervals with the local device processing the viewer pose and received scene data locally to provide a real time low lag experience. This may for example reduce the required communication bandwidth substantially while providing a low lag experience and while allowing the scene data to be centrally stored, generated, and maintained. It may for example be suitable for applications where a VR experience is provided to a plurality of remote devices.

Figure 2:
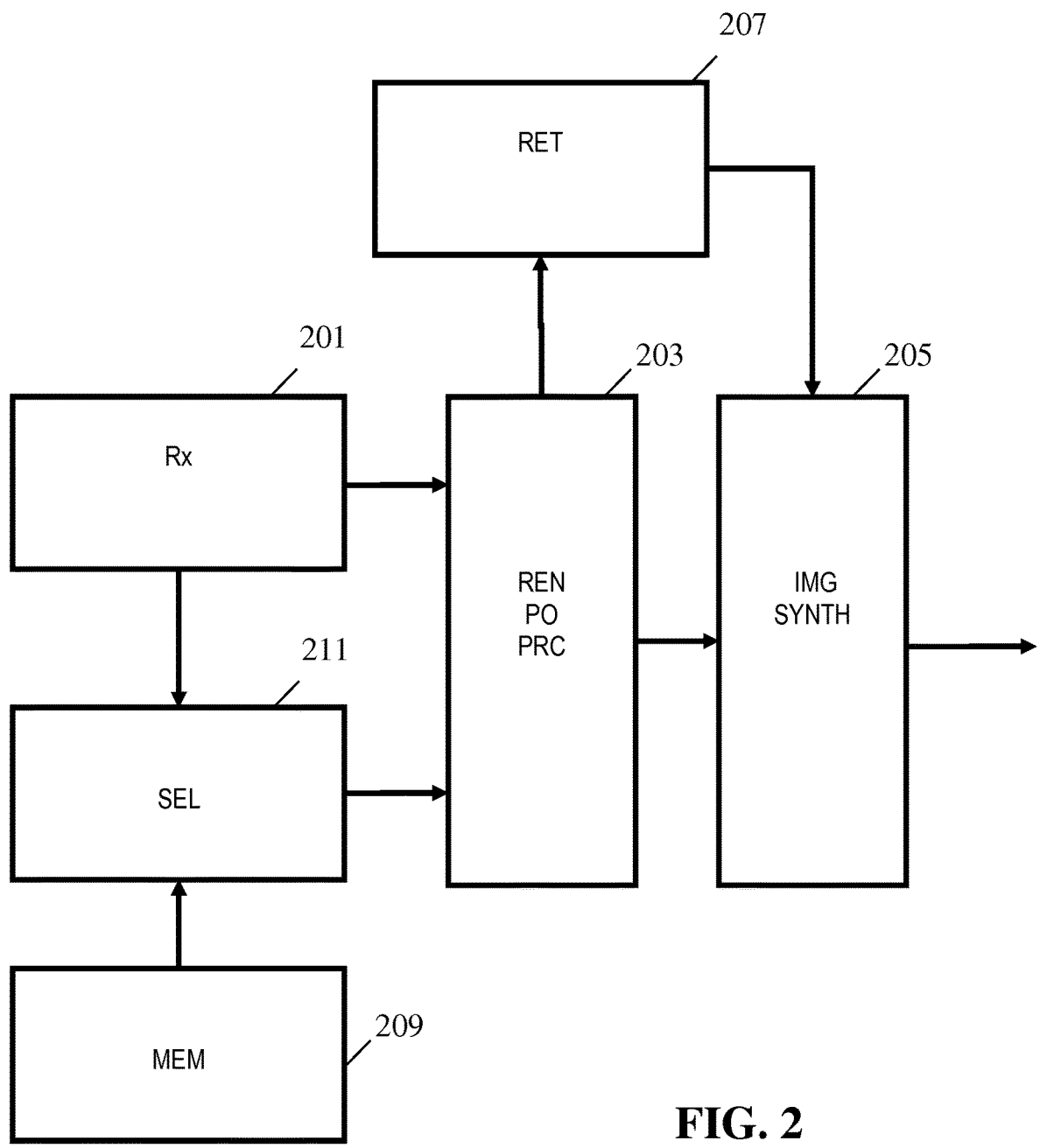
FIG. 2 illustrates an example of elements of an apparatus in accordance with some embodiments of the invention.

FIG. 2 illustrates an apparatus for generating images of a virtual scene in response to a viewer pose in accordance with some embodiments of the invention. The approach may in particular be suitable for embodiments in which e.g. a virtual reality experience is provided for a live event captured by a relative low number of capture devices (typically 3D cameras).

As a clarifying and illustrative example, an application may be considered in which a sports event such as a basketball game is captured by a few spatially offset 3D cameras (e.g. stereo cameras or ranging cameras which may provide an image and associated depth map or indeed stereo images and associated 3D maps). For example, the event may be captured by three 3D cameras in line and with a distance between them of e.g. 50 cm. The cameras may e.g. be positioned corresponding to three continuous seats on the first row of the basketball game.

In such a scenario, the apparatus of FIG. 2 may e.g. be used to provide a user experience that gives the user the feeling of actually sitting in the first row. It may e.g. support him looking around and with the view adapting to the head movements. As will be described the approach may also allow the user to change his viewpoint more in order to e.g. look around objects.

Specifically, in this example, the apparatus may provide a VR experience which offers the viewer a limited amount of motion freedom such that while seated a viewer can move his head a little and see a corresponding small change in view-point (parallax shift). To increase the level of immersion more, the approach may support the viewer being able to look around an occluding foreground object. For instance, during a basketball game it may support the viewer being able to look around a player that occludes the ball or an important action, or, during a tennis match it may allow the user to look around a tennis player to see the path of the ball.

The apparatus of FIG. 2 comprises a receiver 201 which is arranged to receive a viewer pose for a viewer. The apparatus may generate one or more view images corresponding to the view pose.

In some embodiments, the receiver 201 may directly receive view pose data defining a view pose e.g. from a VR headset or from an internal processor arranged to determine and calculate a view pose based on sensor input data. For example, the apparatus may comprise a sensor input processor (not shown) which is arranged to receive data from sensors detecting the movement of a viewer or equipment related to the viewer. The sensor input is specifically arranged to receive data which is indicative of a head pose of a viewer. In response to the sensor input, the sensor input processor is arranged to determine/estimate a current head pose for the viewer as will be known by the skilled person. For example, based on acceleration, gyro, and camera sensor data from a headset, the sensor input processor can estimate and track the position and orientation of the headset and thus the viewer's head. Alternatively or additionally, a camera may e.g. be used to capture the viewing environment and the images from the camera may be used to estimate and track the viewer's head position and orientation. The following description will focus on embodiments wherein the head pose is determined with six degrees of freedom, but it will be appreciated that fewer degrees of freedom may be considered in other embodiments. The sensor input processor 201 may then feed the head pose to the receiver 201 to use as the viewer pose.

The receiver is coupled to a render pose processor 203 which is arranged to generate render poses from the viewer poses. The viewer pose reflects the user's pose in the real world and may specifically be provided as a set of vector parameter values reflecting real world coordinate references. Specifically, the view pose may be indicative of the change in positions of the user's head in the real world.

The render pose is generated to refer to a viewing pose, and specifically view point and view direction, in the virtual scene. The render pose is specifically indicative of a pose in a coordinate system of the virtual scene. The render pose reflects a desired pose in the virtual scene/world for which view images are to be generated. Thus, the desired base pose for rendering view images is reflected by the render pose. The render pose may specifically be provided as a set of vector parameter values reflecting virtual scene/world coordinate references.

The render pose processor 203 may specifically map the viewer pose to a render pose, and thus may specifically may map the head/viewer pose in the real world reference/coordinate system to the render pose in the virtual scene/world reference/coordinate system. The render pose processor 203 may accordingly on basis of the viewer motion determine a corresponding render pose in the virtual scene corresponding to the virtual viewing pose of the viewer. The render pose processor 203 may be arranged to perform a mapping from the current viewer pose to the render pose which is independent of all other viewer poses than the current viewer pose (and which specifically is independent of past and future viewer poses).

The render pose processor 203 is coupled to an image synthesizer 205 which is arranged to synthesize images for the render pose. The image synthesizer 205 may specifically generate view images that correspond to the view ports in the virtual scene for the given render pose. The view images may specifically be stereo images corresponding to a left eye viewport and a right eye viewport. The user presented with these images, e.g. in a VR headset, will accordingly be provided the views that a viewer positioned in the virtual world at the position and with the orientation given by the render pose would experience.

The render pose processor 203 is arranged to generate the images based on three dimensional (3D) image data describing the scene. The 3D image data is retrieved by a retriever 207. In some embodiments, the retriever 207 may be arranged to retrieve appropriate 3D image data from an internal source.

For example, a recording of the basketball game including all three camera feeds may be provided on a Blu-Ray™ disc or may e.g. be stored in local memory following a download. The retriever 207 may then retrieve the stream of 3D image data for e.g. the central camera and feed this to the image synthesizer 205 which may generate the appropriate view images for the current render pose.

In other embodiments, the retriever 207 may be arranged to retrieve the 3D image data from a remote source. For example, a remote source may broadcast the camera feeds in real time for a live event and the retriever 207 may comprise a receiver which is arranged to receive the streams and feed the appropriate stream to the image synthesizer 205 which may then process these to generate the appropriate view images.

In yet other embodiments, the 3D image data may be provided by a remote server, such as the remote VR server 103 of FIG. 1, in response to explicit requests from the client. In such embodiments the retriever 207 may generate requests for 3D image data at e.g. periodic times and transmit these to the server which will provide the required 3D image data. In many embodiments, a more flexible approach may be used where the request is for a stream of data to be provided with the requested stream then being continuously provided until a new request is transmitted. For example, following a request, 3D image data in the form of a data stream from one camera may continuously be provided to the retriever 207 from the server until a new request is transmitted, e.g. for the server to instead provide a data stream from a different camera.

It will be appreciated that the specific 3D image data provided, and the specific algorithm used by the image synthesizer 205 to generate the images, will depend on the preferences and requirements of the individual embodiment. Indeed, many different approaches for generating view images for a specific render pose based on 3D image data is known and any suitable approach may be used without detracting from the invention.

For example, in many embodiments, the 3D image data may be provided in the form of stereo images or image+depth for the positions of the cameras, i.e. for the capture positions. The image synthesizer 205 may then perform view synthesis using this data to generate view images for the specific viewports of the current render pose using a conventional view shift algorithm as will be well known to the skilled person.

In some embodiments, the 3D image data may be provided in the form of stereo images for which each stereo image (i.e. both for the left and right eye) may further be associated with a depth map.

In the apparatus of FIG. 2, the generation of the render pose and the retrieval of the 3D image data is not merely based on the viewer pose or the movement of the viewer but is further in consideration of anchor points in the scene, and specifically is dependent on a currently selected reference anchor pose for the scene.

The apparatus comprises an anchor pose store 209 which stores a set of anchor poses. Each anchor pose may be represented by both an orientation and a position or may e.g. in some embodiments be represented by only an orientation or only a position. Further, the number of parameters defined for each anchor pose may depend on the individual embodiment, and typically on the degrees of freedom for the capture poses. For example, for the basketball game example, the three stereo cameras may have a fixed orientation towards the court and be known to be in a straight line with a known direction. Accordingly, the anchor pose for each (stereo) camera may in this example be represented by a single position coordinate (referred to as the x-coordinate in the following).

The anchor poses may typically correspond to poses within the scene for which 3D image data is available. Thus, the scene may be represented by 3D image data for a plurality of anchor poses, and the set of anchor poses stored in the anchor pose store 209 may comprise at least two of these anchor poses. In many embodiments, the anchor poses may correspond to camera poses or capture poses for the scene (including possible virtual camera/capture poses).

The apparatus comprises a selector 211 which is coupled to the receiver 201 and the anchor pose store 209. The selector 211 is arranged to select a reference anchor pose from the set of reference poses and feed this selection to the render pose processor 203. The render pose processor 203 then determines the render pose relative to this render pose such that the render pose depends both on the currently selected reference anchor pose and on the viewer pose. Accordingly, the render pose will depend on both the movement of the viewer as reflected in the viewer poses and on the selection of the reference anchor pose. A change in the reference anchor pose will cause a change in the render pose and indeed the render pose may for the same viewer pose be different for different anchor poses being selected as the reference anchor pose.

The selection of the reference anchor pose is based on the viewer poses and the selector 211 is arranged to specifically switch the reference anchor pose from a first anchor pose of the set of anchor poses to a second anchor pose of the set of anchor poses in response to the viewer poses, and specifically if the viewer poses meet a criterion. The criterion may be dependent on/include a consideration of other viewer poses than the current viewer pose and may specifically be dependent on previous viewer poses, either directly by considering the other viewer poses or by considering the currently or previously selected reference anchor poses (which have been selected based on previous viewer poses).

Thus, if the selector 211 has currently selected the first anchor pose as the reference anchor pose, it may continuously monitor the viewer poses. If it is detected that the viewer pose meets a given selection criterion (which typically may consider the current anchor pose or a previous viewer pose), the selector 211 may change the selection of the reference anchor pose from the first anchor pose to a second anchor pose.

The approach may be illustrated by an application corresponding to the specific example previously mentioned where three stereo cameras are capturing a basketball game with the cameras being positioned in line with an inter-distance of 50 cm. In such an embodiment, small movements around a nominal centrally positioned stereo pair may be directly mapped to corresponding movements in the virtual world. For example, the user may initially be in a standard/nominal position represented by a given viewer pose. The apparatus may initially select the reference anchor pose to be that of the center stereo camera and the current viewer pose may be mapped to this reference anchor pose. Thus, the apparatus will for this viewer pose generate view images corresponding to a viewer being at the position of the central stereo camera in the scene.

For small movements, the apparatus may generate the render pose to follow the viewer poses such that the movements of the viewer in the virtual world, as represented by the render pose, follow the movements of the viewer in the real world, as represented by the viewer poses. This may result in a completely natural experience where the resulting parallax follows the head movement and a natural experience is provided to the user.

However, if the user translates (moves his head sideways in the x direction) by more than a certain amount (say 5 cm), the selector 211 may detect that the viewer pose has changed by more than a given threshold and it may change the selected reference anchor pose. For example, if the user moves his head to the left by more than a given amount, the selector 211 may switch the reference anchor pose from the anchor pose corresponding to the central camera to the one corresponding to the left camera. This change in reference anchor pose is fed to the render pose processor 203 which proceeds to determine the render pose to now be at a position that is, e.g. 5 cm to the right of the left stereo camera. If the user continues his movement to the left, the user will follow the movement and provide correct parallax with respect to the left stereo camera position.

Thus, the user will experience a situation where he can watch the basketball game from three different positions with correct parallax for each position as long as movements are kept relatively small. Further, he can use larger head movements to switch between different viewpoints with a large head movement effectively causing a virtual teleportation from one view point to another, such as specifically from one camera position to the other.

Figure 3:
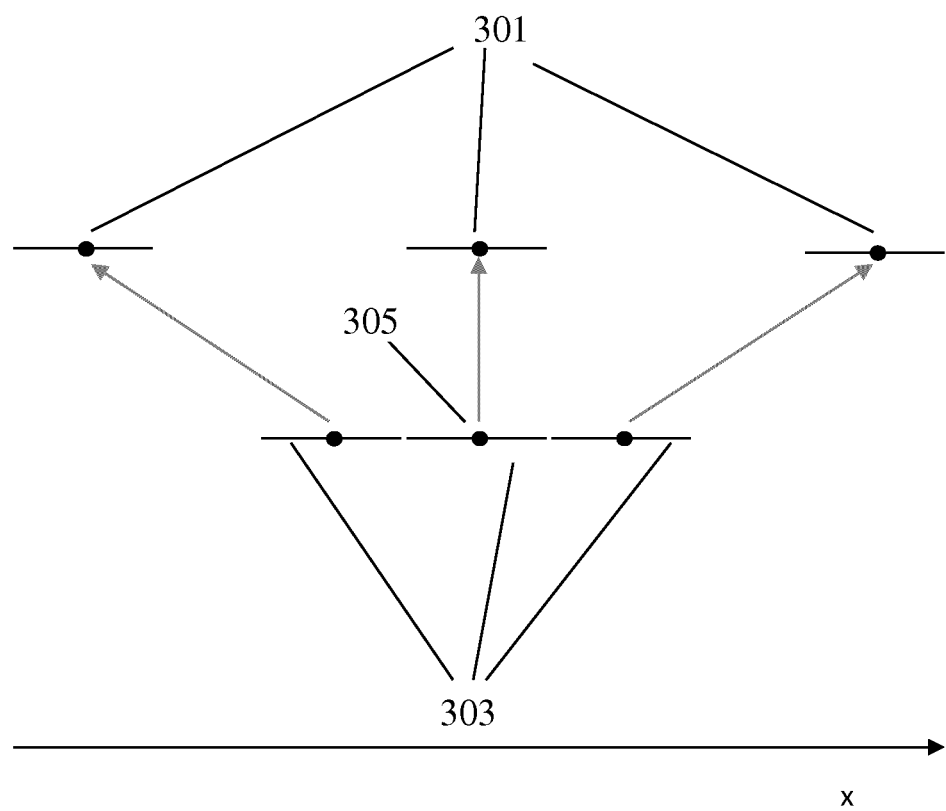
FIG. 3 illustrates an example of mapping of viewer poses to render poses by some exemplary implementations of the apparatus of FIG. 2.

The approach can be illustrated by FIG. 3 which shows three camera/capture/anchor positions 301 in the virtual world with the positions being 50 cm from each other. The figure further shows three 10 cm intervals 303 for the head position in the real world. The three intervals 303 are by the operation of the apparatus mapped to three 10 cm intervals around the anchor positions 301 with the midpoints of the intervals mapping to the anchor positions. Thus, in the example, the users sideways motion within a 30 cm interval is mapped to virtual movements in three distinct intervals where the movement within the intervals directly correspond to each other thereby providing correct parallax, and with the transitions between real world intervals resulting in teleporting between different discrete intervals in the virtual world.

Figure 4:
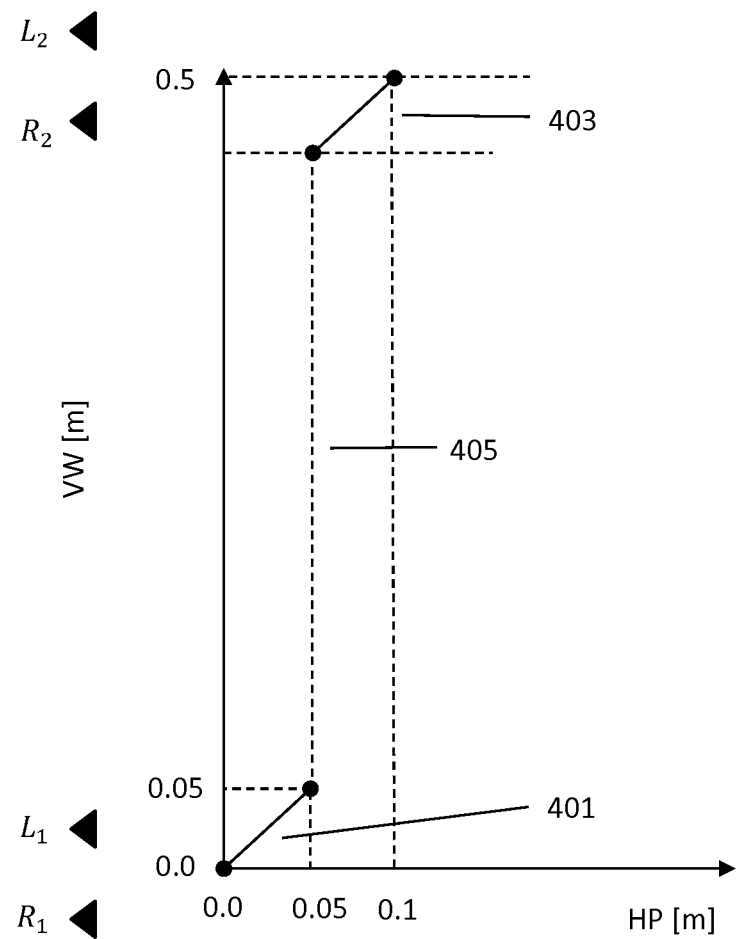
FIG. 4 illustrates an example of mapping of viewer poses to render poses by some exemplary implementations of the apparatus of FIG. 2.

The example may also be illustrated by FIG. 4 which shows the resulting mapping from the viewer movements/positions represented by the viewer poses to the virtual movement/positions represented by the render poses. In the example, the x position in the real world/viewer pose coordinate system is mapped to an x-position in the virtual world/render pose coordinate system by positions within 0-5 cm to the left of a nominal viewer position being mapped 1:1 to positions within 0-5 cm to the left from the center anchor position and positions within 5-10 cm to the left of a nominal viewer position being mapped 1:1 to positions within 0-5 cm to the right of the left anchor position. Thus, the interval 401 of [0; 0.05] in the viewer pose coordinate system is mapped linearly to an interval [0; 0.05] in the render pose coordinate system; and the interval 403 of [0.05; 0.1] in the viewer pose coordinate system is mapped linearly to an interval [0.45; 0.5] in the render pose coordinate system. Accordingly, there is an interval 405 of [0.05; 0.45] in the virtual scene which is not used and to which no viewer position is mapped.

Thus, the combined approach of considering not only the viewer poses but also anchor poses provides an enhanced effect that has been found to be very desirable in many embodiments. Specifically, for small movements, the user will experience a true motion parallax but for higher movements he will teleport to a different position/pose. This may provide an effect wherein natural parallax is experienced for the majority of the time while still allowing the user to e.g. look around foreground objects by changing his position. Further, both the teleporting effect and the natural parallax movement is a function of the user's movement, and therefore an intuitive and user friendly control is provided. In addition, the approach may ensure a high quality as the view images may be generated for render poses relatively close to the anchor poses for which 3D image data is available. The significant position dependent image degradation known from many systems may be avoided or at least significantly reduced.

As an example, the perceived effect may be that when user is sitting normally in a chair, he will be able to experience the small view-point changes around the center position with e.g. natural parallax. When the viewer needs to see around an object to the right, he can move his head further to the right. At that moment his motion will be exaggerated, and he will be quickly teleported to a new virtual viewing position to the right of him where he will come to a standstill. The quick teleport in combination with view-blending will hide view-interpolation artefacts.

Another advantage of the described approach is that it can provide a very desirable and flexible experience with only a few capture positions/cameras. Indeed, a problem of offering the viewer more motion freedom is that it immediately translates to higher requirements of the processing of the 3D scene information and/or to higher requirements on the number of cameras that are used for capturing/representing the scene. The approach may avoid the need for a large number of cameras which may even enable the provision of an otherwise impractical application. The reduced need for camera feeds/capture point data also substantially facilitates encoding, transmission and rendering.

A key feature of the approach is that the system is not merely directed to generating an image corresponding to the current viewer pose but rather this viewer pose is mapped into a render pose depending on the selected anchor pose. The determination of the current render pose is by applying a mapping to the current viewer pose. However, the mapping is not a constant mapping but is dependent on the selected anchor pose. Depending on the viewer poses, the system selects an anchor pose and the generation of an image for the render pose is based on 3D image data provided for this anchor pose. Further, the change in the selected anchor pose also results in a change in the mapping, i.e. the mapping is dependent on the selected anchor pose. Thus, the same viewer pose may result in different render poses depending on which anchor pose is selected. The render pose is dependent both on the current viewer pose and on the selected anchor pose—which is again also dependent on the viewer pose.

This approach allows for a range of effects to be achieved depending on the specific selection of the mapping for the individual anchor pose and the criterion for switching anchor poses. It is also noted that the specific approach is not the same as simply providing a more complex mapping to the viewer pose to determine the render pose. Rather, the selection and adaptation of the mapping is closely related to which image data is used for the generation of the image for the rendering position. The approach may for example provide an effect where the render pose sticks close to one anchor pose (with high quality) until it moves far enough to jump to another render pose after which it sticks to this new pose. However, of course, many other effects and applications are possible, and these can be designed for the specific application by the selection of which mappings to apply and which criterion to use for switching anchor poses. However, common for all is that the mapping not only depends on the viewer pose but also on which anchor pose is currently used for providing the 3D image data for the synthesis.

The specific mapping used and the criterion for selection of the anchor point will be selected depending on the specific requirements of the individual embodiment and application, and it will be appreciated that an unlimited number of algorithms, mappings, criteria, and effects can be used/achieved. The approach may allow a more flexible approach where in particular in many embodiments, a bias towards (or indeed away from if desired) anchor poses can be achieved. The approach may adapt to the current anchor pose configuration and can provide advantageous performance for a range of anchor pose configurations.

A particular advantage of the approach is that it may provide a consistently high image quality. In particular, it may restrict view points to be very close to anchor poses for which 3D image data is provided. Thus, although e.g. view shifting may be used to generate images from viewpoints for which the 3D image data does not include explicit data, the view shifts required are typically small and thus can be performed without high degradation. Indeed, for most of the time, the viewer may view the scene from the anchor position and thus no view shifting may be necessary. For example, if the 3D image data is in the form of stereo images for the capture poses, these images may be presented directly without any degradation being caused by any 3D processing.

In many embodiments, the render pose processor 203 is thus arranged to determine the render pose from a mapping of viewer poses to render poses where the mapping depends on which anchor pose of the set of anchor poses is selected as the reference anchor pose.

Exemplary mappings between viewer poses and render poses have been described with respect to FIGS. 3 and 4 where the render pose is determined as the viewer position plus an offset which is dependent on the selected anchor pose. In these examples, the mapping between viewer pose and render pose is a one to one mapping with a one to one correspondence (a bijective function) where the changes of anchor poses are used to introduce gaps in the output range. In the example, the mapping comprises applying a different offset to the render pose depending on which anchor pose of the set of anchor poses is selected as the reference anchor pose. Specifically, for the example of FIG. 3, if the center anchor pose is selected, an offset of zero is applied, if the left hand anchor pose is selected an offset of −40 cm is applied, and if the right hand anchor pose is selected an offset of +40 cm is applied (assuming the distance between cameras is 50 cm and that the x-direction is from left to right, i.e. increasing positive values are indicative of positions further to the right).

Figure 5:
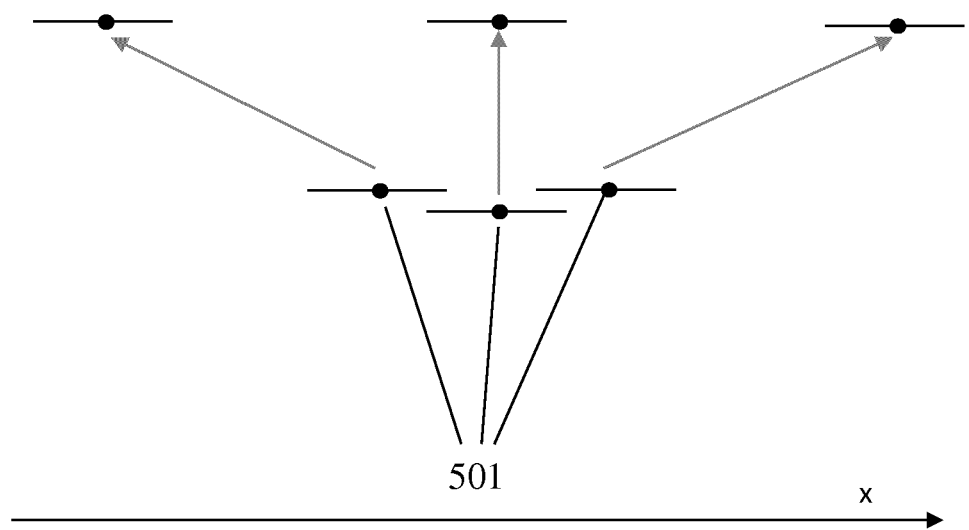
FIG. 5 illustrates an example of mapping of viewer poses to render poses by some exemplary implementations of the apparatus of FIG. 2.

In other embodiments, other mappings may be used. Indeed, any suitable mapping and anchor pose dependency may be applied with the specific mapping being selected to provide the desired effect, such as e.g. the desired bias towards, and/or away from, anchor poses. In many mappings the same viewer pose may map to different positions depending on the selected anchor pose (for at least some viewer poses). An example of this is illustrated in FIG. 5 which is also based on the render pose processor 203 applying a different offset to determine the render pose depending on which anchor pose is selected as the reference anchor pose. The example corresponds to that of FIG. 3 except that the offsets are different and the selections between the anchor pose are no longer just dependent on the viewer pose but also depend on which anchor pose is currently selected as the reference anchor pose.

In this example, the offset is still zero for the central anchor pose being selected but is −43 cm if the left anchor pose is selected and +43 cm if the right hand anchor pose is selected.

The threshold for switching from the center anchor pose to the left anchor pose is still −5 cm and the threshold for switching from the center anchor pose to the right anchor pose is still +5 cm. However, the threshold for switching from the left anchor pose to the center anchor pose is now −2 cm and the threshold for switching from the right anchor pose to the center anchor pose is now +2 cm.

In this case, the render pose determined for a viewer pose in the range of −5 cm to −2 cm and of +2 cm to +5 cm depends on which anchor pose is currently/previously selected as the reference anchor pose. If the left anchor pose is selected, the range of [−0.05; −0.02] maps to [−0.48; −0.45] and if the center anchor pose is selected it maps to [−0.05; −0.02]. Similarly, if the right anchor pose is selected, the range of [0.02; 0.05] maps to [0.45; 0.48] and if the center anchor pose is selected it maps to [0.02; 0.05]. Further, as long as the viewer pose do not exceed these ranges, no change in reference anchor pose occurs.

Such an approach may often provide a more stable experience with fewer view shifts/teleportations. It may introduce a hysteresis effect that provides an improved experience to the user.

In many embodiments, including the described examples, the render pose processor 203 is arranged to monotonically map viewer poses to render poses for the same reference anchor pose. Thus, as long as no change occurs in the reference anchor pose, the viewer pose is mapped to the render pose such that a viewer move in a given direction is mapped to a render pose change/move in the same direction.

Further, in many embodiments the mapping is a constant linear mapping for a distance from the render pose to the reference anchor pose not exceeding a threshold. Thus, in many embodiments, the mapping applied to result in render poses for which the distance to the reference anchor pose does not exceed a threshold is a linear mapping. The mapping to result in poses for which the distance to the reference anchor pose does exceed the threshold may in some embodiments also be a linear mapping (and the whole mapping may be a linear mapping) but may in many embodiments include a non-linear element, such as a step function. A constant mapping may be time invariant. In many embodiments, a linear mapping may be constant in the sense of having a constant mapping factor.

The mapping function may be a one-to-one function, specifically between a distance from a viewer pose to a viewer reference pose corresponding to the reference anchor pose and a distance from the render pose to the reference anchor pose. The mapping function may be a monotonic function, specifically between a distance from a viewer pose to a viewer reference pose corresponding to the reference anchor pose and a distance from the render pose to the reference anchor pose. In such embodiments, the range/set of render poses for which the distance to the reference anchor pose does not exceed a threshold may be mappings of a range/set of viewer poses for which a distance to the viewer anchor pose does not exceed a second threshold.

Thus, for the difference between the render pose and the reference anchor pose being sufficiently low, the mapping is linear such that the same relative movement in the viewer pose domain (specifically in the real world) results in the same relative movement in the virtual domain regardless of the absolute position of the viewer. This may provide a more realistic experience to the user as it corresponds to the experience that a real spectator would experience.

In many situations, a linear mapping may be provided for all possible positions for a given reference anchor pose. E.g. in the examples of FIGS. 3-5, the entire range of a given position interval in the viewer pose interval corresponding to one anchor pose is linearly mapped to a render pose interval. However, it will be appreciated that in some embodiments, the linear mapping may be performed for a position range close to the anchor pose whereas a different, e.g. non-linear mapping may be applied to positions further from the anchor pose. This may for example provide an effect of an increasing position change towards the end of an interval thereby giving the user an indication of the approach of a teleport action.

In many embodiments, the linear mapping may have a scale factor of no less than 50% and no more than 150%. Thus, in such embodiments, a relative change of position in a given direction in the viewer pose may result in a relative change in the render pose which is no less than 50% and no more than 150% of the original change. This may provide an effect wherein the perceived movement corresponds very closely to the actual movement thereby providing a natural effect. In many embodiments, the scale factor may be set exactly to 100% (as in the examples of FIGS. 3-5) in order to provide an experience corresponding to that which would have been experienced by an actual viewer. However, in some embodiments, it may be considered advantageous to attenuate or exaggerate the movement to provide an enhanced effect.

As previously described, the selector 211 may in many embodiments be arranged to switch the reference anchor pose to a different anchor pose in response to a detection that the viewer pose deviates by a given amount from a nominal position.

Thus, in some embodiments, the selector 211 may be arranged to switch the reference anchor pose to a different anchor pose in response to a detection that the current viewer pose meets a criterion which includes or indeed consists in a requirement that a distance between the viewer pose and a reference viewer pose exceeds a threshold. The reference viewer pose may be a nominal viewer pose which in some embodiments may be a fixed predetermined pose. For example, in FIG. 3, if the viewer pose is indicative of a position within 5 cm of a nominal position 305, the selector 211 may maintain the reference anchor pose as the center anchor pose but if it exceeds 5 cm it may switch to another anchor pose (the left or right anchor pose).

In many embodiments, the selector 211 is arranged to modify the reference viewer pose depending on which anchor pose is selected as the reference anchor pose. For example, for each of the anchor poses there may be a corresponding reference viewer pose in the coordinate system of the viewer pose. For example, in example of FIG. 5, a reference viewer pose 501 is determined for each of the anchor poses. In the example, the selector 211 may accordingly proceed to compare the current viewer pose to the reference viewer pose 501 of the currently selected anchor pose. If the resulting distance exceeds a given threshold, in the example 5 cm, the selector 211 will proceed to another anchor pose. This will result in a new reference viewer pose being used in the comparison but in the specific example the same criterion may be used, specifically it may be determined whether the distance exceeds 5 cm.

In many embodiments, the reference viewer pose may be set to be a position in the coordinate system of the viewer poses which corresponds to the position of the anchor pose in the coordinate system of the render poses. Specifically, the reference viewer pose for the current anchor pose may be set to be the value of the viewer pose which maps to the current anchor pose. However, the reference viewer pose may in other embodiments be set differently depending on the desired effects that are to be achieved. For example, it may be set manually by a user.

It will also be appreciated that whereas the selection examples above have been described with reference to comparisons made in the coordinate systems of the real world/viewer poses, the requirement may equivalently be performed in the coordinate system of the virtual scene/render poses. Specifically, the mapping of the current viewer pose to a render pose may be compared to the anchor pose and e.g. the distance between these may be compared to a threshold.

In many embodiments, the distance threshold may be dependent on which anchor pose of the set of anchor poses is selected as the reference anchor pose. For example, the distance threshold may be higher for a center anchor pose than for a non-center anchor pose. E.g. the example of FIG. 1 could be modified such that the center anchor pose is selected unless the viewer pose is more than, say, 10 cm from the corresponding reference viewer pose whereas the distance to switch may be kept at 5 cm for the right and left anchor poses. Such an approach may provide a stronger bias towards the center view that may be advantageous in many embodiments, such as e.g. situations where the 3D image data is at a higher quality for the center anchor pose (e.g. including some de-occlusion data).

Further, the distance threshold may for at least some anchor poses in many embodiments be dependent on the direction of the difference. For example, for the side anchor poses of FIG. 3, the distance threshold may be 5 cm towards the center but infinite away from the center.

In the above example, the selection of the reference anchor pose was described as only depending on the position, but it will be appreciated that in other embodiments only the orientation may be considered or both position and orientation may be considered.

As an example, in many embodiments, the selection criterion may consider the distance between the position of the viewer pose and the position of the reference viewer pose/reference anchor pose, e.g. as described above. However, the decision threshold for when to switch anchor pose may be dependent on the orientation of the viewer pose. Specifically, the difference between an orientation of the viewer pose and a reference orientation may be considered and used to adapt the distance threshold. In this way, the decision of when to switch anchor pose does not only depend on the position (specifically translational position) of the user but also on the orientation, e.g. the angular direction, of the viewer. The selection may accordingly depend both on the position of the viewer and on where he is looking.

Specifically, the distance threshold may be a monotonically increasing function of the difference between the current viewer pose and a reference orientation. For example, for the basketball application, the threshold may increase as a function of an increasing angular difference between the viewer's orientation and a direction corresponding to looking straight ahead towards the court. The translational movement required for a switch of anchor pose may thus increase the more the viewer has turned his head.

Figure 6:
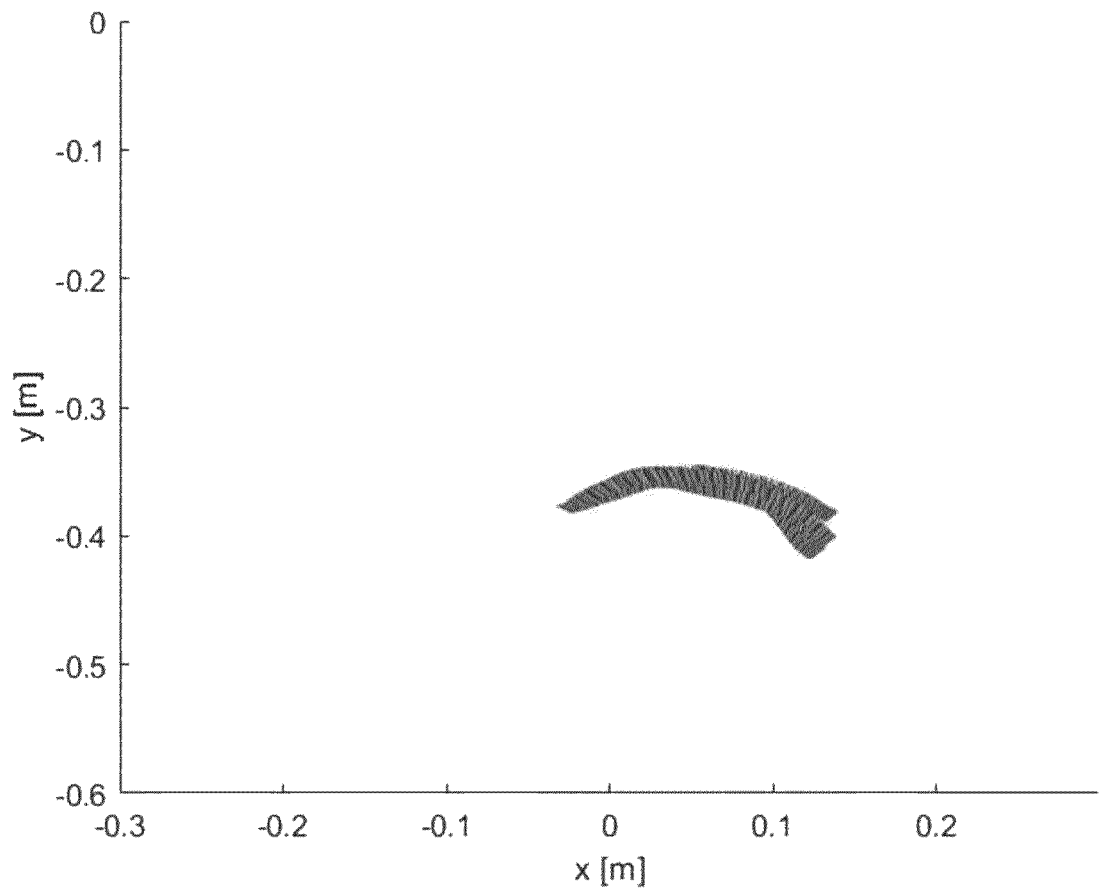
FIG. 6 illustrates an example of viewer movements.
Figure 7:
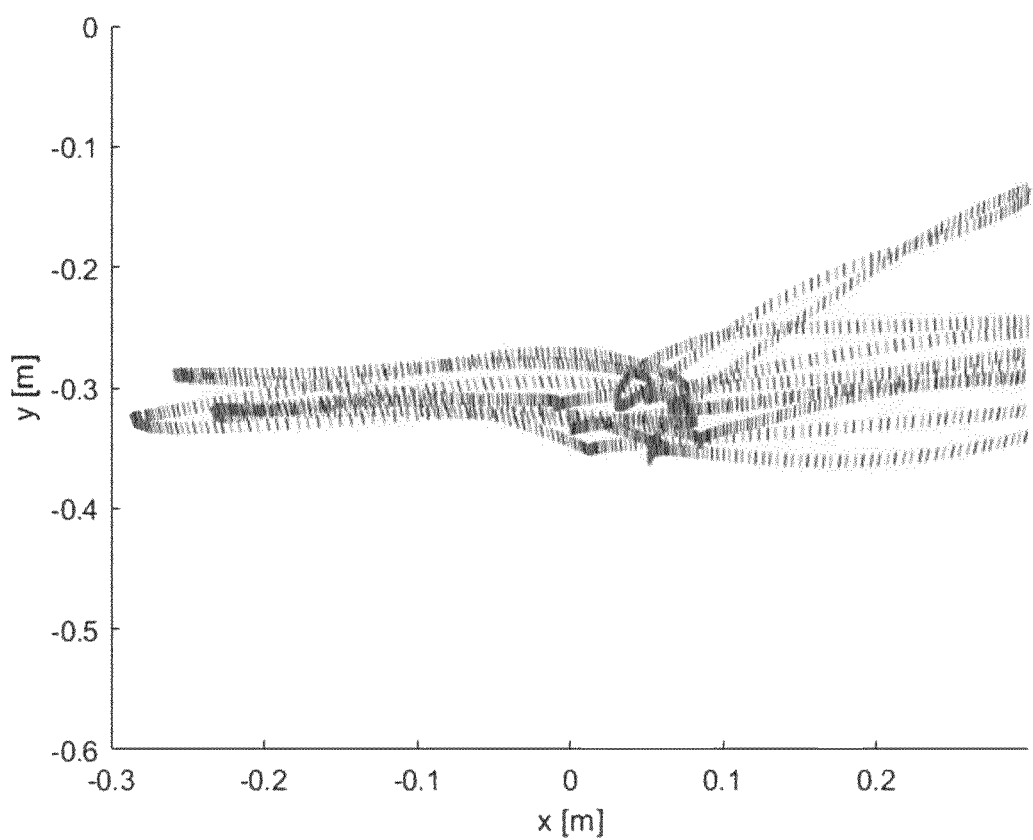
FIG. 7 illustrates an example of viewer movements.

Thus, whereas the examples of FIGS. 3-5 focused on a situation where the rendering is fully determined by the lateral x position of the viewer, more characteristics of the viewer may be taken into account in order to decide when to snap to a different view-point (i.e. when to switch the reference anchor pose to a different anchor pose). As an example, the experimental position and orientation data shown in FIGS. 6 and 7 may be considered. FIG. 6 shows data reflecting a user rotating his head to look in different directions at different parts of a scene and FIG. 7 shows data reflecting a user that is translating his head in an attempt to look around a foreground object that is obstructing his view. The figures clearly suggest that when considering both lateral x position of the viewer and orientation angle θ relative to the viewing direction of the anchor pose, a better estimate may be made about the intended motion of the viewer, i.e. whether the user is just rotating his head (FIG. 6) or trying to look around an object (FIG. 7).

In some embodiments, the apparatus may seek to detect when a viewer wants to snap to a new viewing position in order to initiate the fast head-motion-induced transition, i.e.

when the user is seeking a teleportation to a new viewpoint, based on both position and orientation.

Figure 8:
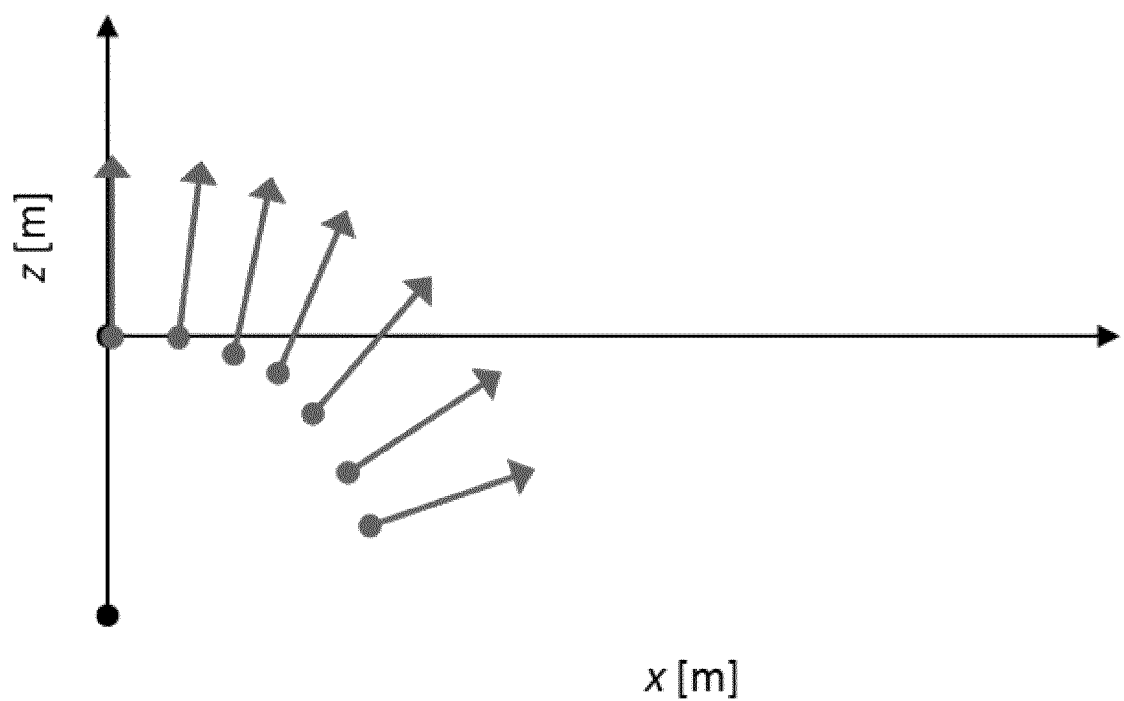
FIG. 8 illustrates an example of viewer movements.
Figure 9:
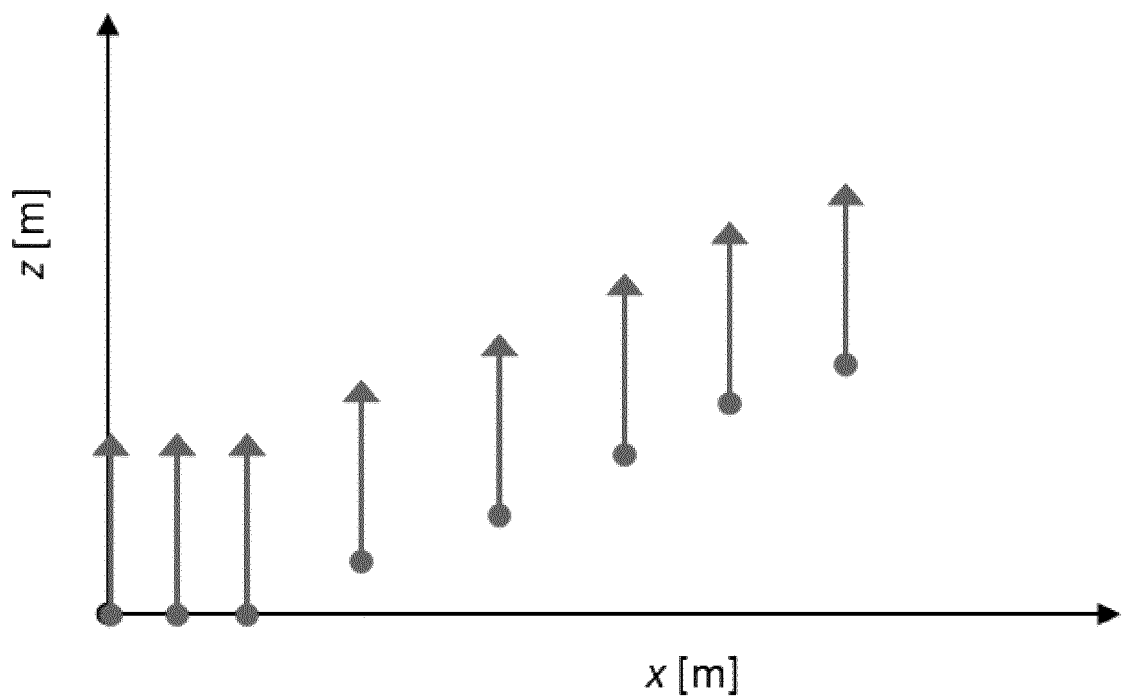
FIG. 9 illustrates an example of viewer movements.
Figure 10:
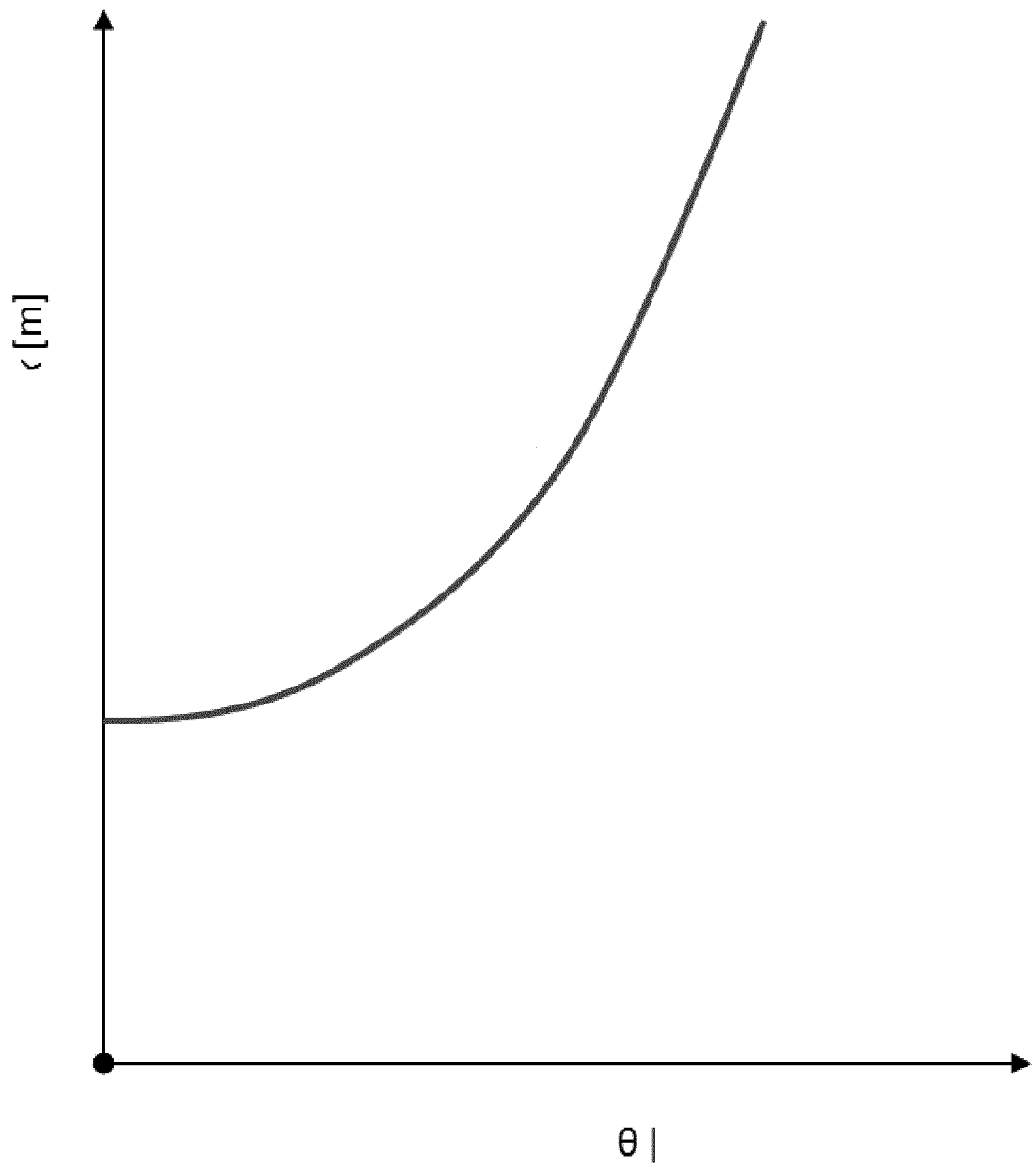
FIG. 10 illustrates an example of a decision boundary used by some exemplary implementations of the apparatus of FIG. 2.

In the example, the selector 211 may consider both the lateral x position of the viewer pose and the orientation angle θ relative to the viewing direction. As illustrated in FIG. 8, when looking around, a viewer's eyes typically perform small lateral translational motion, combined with orientation changes. A viewer interested in looking around an occluding object tends to keep looking in the same orientation, combined with (usually larger and faster) lateral motion as shown in FIG. 9. A decision boundary (for the center anchor pose/camera) may be created is a function of lateral x position and orientation angle θ as shown in FIG. 10. If the lateral position (the distance, y axis) exceeds the function of the orientation angle (x-axis), then the selector 211 switches the reference anchor pose and otherwise it keeps the reference anchor pose unchanged. The example shows a decision boundary where the lateral x position is a monotonically increasing function of orientation angle θ. Below the decision boundary, renderings are done from the original position (unchanged reference anchor pose) but above the decision boundary, the user 'snaps' to a new viewing position to the right (or left as appropriate) of the current position (i.e. new anchor pose is selected for the reference anchor pose). Corresponding decision boundaries may be determined for the other anchor poses/cameras.

In some embodiments, the selector 211 may be arranged to switch the reference anchor pose in response to a rate of change of the viewer poses. For example, in some embodiments, the user may be able to switch between anchor poses by e.g. performing a swift head movement in the desired direction or e.g. by quickly turning his head. If the determined viewer pose rate of change exceeds a given threshold, it is considered that the movement is not a natural movement when statically viewing a scene, and therefore it may be interpreted as an input instruction to switch the anchor pose in order to switch to a different view position.

In other embodiments, a more subtle modification may e.g. be applied. For example, the distance from a nominal position that is required before an anchor pose switch occurs may depend on the speed of the position changes. If the user moves his head slowly, it is considered likely that he is merely moving his head as part of a natural viewing experience and therefore a relatively long distance is required before switching. However, if the user moves his head quickly, this may be interpreted as indicative of the user possibly trying to look around a foreground object, and the distance may be reduced to result in an earlier view point shift/teleportation.

As previously discussed the retriever 207 retrieves 3D image data for the selected reference anchor pose and the image synthesizer 205 uses this when generating the images for the render pose. In some embodiments, the retriever 207 may further be arranged to retrieve 3D image data for a second anchor pose and this second 3D image data may also be fed to the image synthesizer 205 and used to generate the images for the render pose. This second 3D image data may be used to improve the quality of rendering in order to generate improved view images. For example, the additional 3D image data for the second anchor pose may be used to improve infilling of areas that may be deoccluded by the shift of the first 3D image data from the reference anchor pose to the render pose. The 3D image data from a second anchor pose may represent the scene from a different position and may accordingly have information on parts of the scene that are occluded from the reference anchor pose.

In many such embodiments however, the second 3D image data is at a lower quality level than the first 3D image data, i.e. the retrieved 3D image data has a higher quality level for the reference anchor pose than for the second anchor pose. The higher quality level may specifically be a higher data rate (spatial or temporal).

For example, in embodiments where the retriever 207 explicitly requests the 3D image data from a server, the server may proceed to provide a data stream which has the 3D image data for the reference anchor pose at a high quality and 3D image data for one or more neighbor anchor poses at a low quality.

Figure 11:
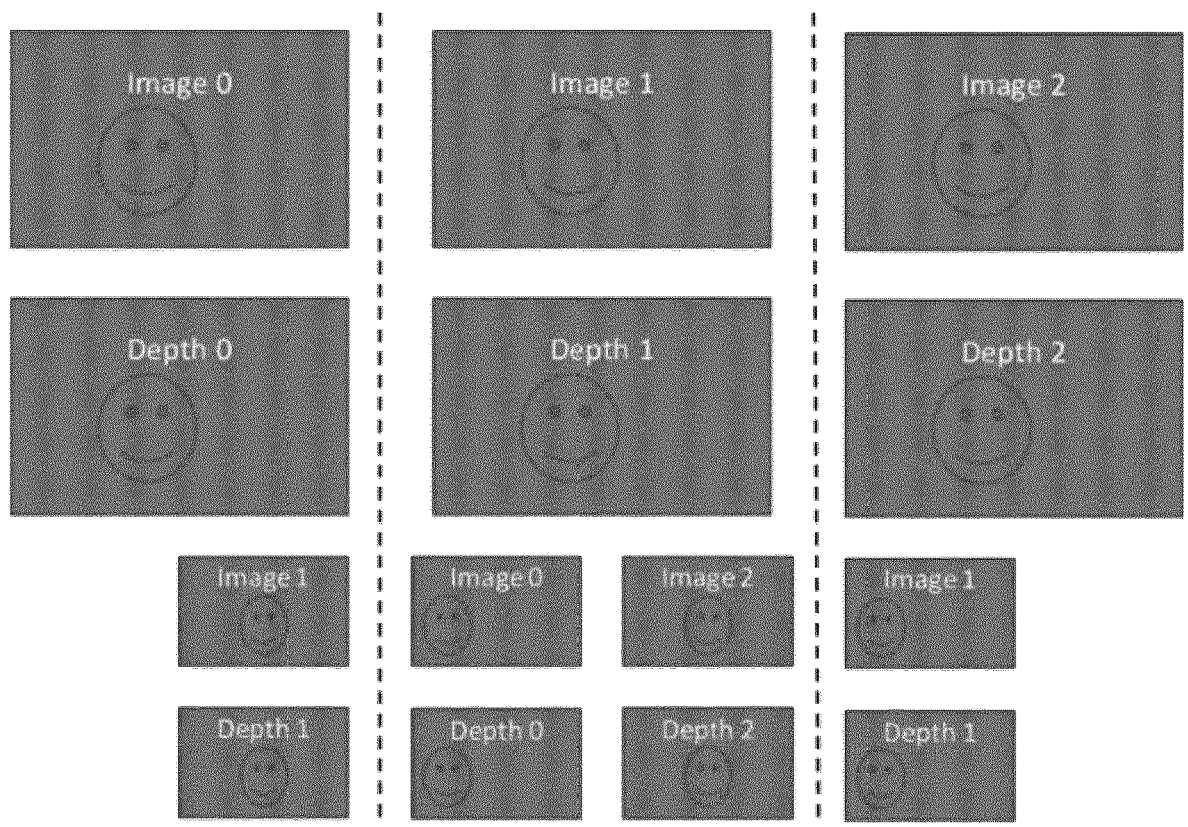
FIG. 11 illustrates an example of 3D image data used by some exemplary implementations of the apparatus of FIG. 2.

As a specific example for the three camera basketball game example, the server may as illustrated in FIG. 11 proceed to provide a high quality image and depth for the selected anchor pose and a low quality for neighboring anchor pose(s) (in the example, the quality of the image and depth maps is indicated by the size of the corresponding object reflecting e.g. a difference in spatial resolution).

Thus, in this example, the provided data stream also includes e.g. low-resolution versions of 3D image data for neighbor anchor poses with this data being used for view synthesis and blending between anchors. While the viewer is in a position close to the center position, he sees views that are generated from the center image (pair) and depth (pair). Once it is detected that he makes a bigger movement, a snap to the next position is initiated by a change in the selection of the reference anchor pose. The transmitted content is consequently changed to the new position at full resolution, and again with the neighbors at lower resolution.

It will be appreciated that different implementations may be used in different embodiments. The approach may for example be implemented by one or more processors executing a method where e.g. one subroutine uses a look up table to map from a (typically relative) viewer pose to a (typically relative) render pose. This subroutine may be executed with a given repetition frequency to provide render poses updated at a given frequency. A second subroutine may evaluate the viewer poses to see if a criterion for changing the anchor pose is met. If so, it may change the anchor pose and as a result provide different image data to the synthesizer. In addition, the change in anchor pose is associated with a different mapping being applied to the mapping subroutine, e.g. simply by overwriting the LUT in memory with that linked to the new anchor pose. The repetition rate of this second subroutine is likely to typically be lower (and often substantially lower) than the repetition rate of the first subroutine but could indeed be at the same rate, or even higher than the repetition rate of the first subroutine. The two subroutines may be synchronized with each other (i.e. run sequentially) but need not be and could easily be two parallel and unsynchronized processes.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for generating images of a scene, the apparatus comprising:
   a memory circuit, wherein the memory circuit is arranged to store a set of anchor poses for the scene;
   a receiver circuit, wherein the receiver circuit is arranged to receive viewer poses of a viewer;
   a selector circuit, wherein the selector circuit is arranged to select a reference anchor pose from the set of anchor poses,
      wherein the selector circuit is arranged to switch the reference anchor pose in response to a detection that a first viewer pose meets a criterion,
      wherein criterion comprises a requirement that a second distance exceeds a threshold,
      wherein the second distance is between the first viewer pose and a reference viewer pose;
   a render pose processor circuit, wherein the render pose processor circuit is arranged to determine a first render pose in the scene for a current viewer pose of the viewer poses;
   a retriever circuit, wherein the retriever circuit is arranged to retrieve a first three-dimensional image data for the reference anchor pose; and
   a synthesizer circuit, wherein the synthesizer circuit is arranged to synthesize an image for the first render pose in response to the first three dimensional image data,
   wherein the set of anchor poses comprise a first anchor pose and a second anchor pose,
   wherein the selector circuit is arranged to switch the reference anchor pose from the first anchor pose to the second anchor pose in response to the viewer poses meeting a criterion,
   wherein the render pose processor circuit is arranged to determine the first render pose from a mapping of viewer poses to render poses,
   wherein the mapping depends on which anchor pose of the set of anchor poses is selected as the reference anchor pose.

2. The apparatus of claim 1,
   wherein the render pose processor circuit is arranged to map a viewer pose value to different render pose values for the first anchor pose,
   wherein the first anchor pose is selected as the reference anchor pose,
   wherein the second anchor pose is selected as the reference anchor pose.

3. The apparatus of claim 1, wherein the mapping comprises applying a different offset to the render pose depending on which anchor pose of the set of anchor poses is selected as the reference anchor pose.

4. The apparatus of claim 1, wherein the render pose processor circuit is arranged to map viewer poses to render poses for the same reference anchor pose such that a change in the viewer poses in a first direction is mapped to a change in the render poses in the first direction.

5. The apparatus of claim 1, wherein the selector circuit is arranged to modify the reference viewer pose depending on which anchor pose of the set of anchor poses is selected as the reference anchor pose.

6. The apparatus of claim 1, wherein the second distance is dependent on which anchor pose of the set of anchor poses is selected as the reference anchor pose.

7. The apparatus of claim 1,
   wherein the second distance is a distance between a position of the first viewer pose and a position of the reference viewer pose,
   wherein the selector circuit is arranged to adapt the threshold dependent on a difference between an orientation of the viewer pose and a reference orientation.

8. The apparatus of claim 7, wherein the threshold is a monotonically increasing function of the difference.

9. The apparatus of claim 1, wherein the selector circuit is arranged to switch the reference anchor pose in response to a rate of change of the viewer poses.

10. The apparatus of claim 1,
    wherein the retriever circuit is arranged to retrieve second three dimensional image data for a second anchor pose of the set of anchor poses,
    wherein the synthesizer circuit is arranged to synthesize the image using the second three dimensional data,
    wherein the first three dimensional data has a higher quality level than the second three dimensional data.

11. A method of generating images of a scene, the method comprising:
    storing a set of anchor poses for the scene;
    receiving viewer poses for a viewer;
    selecting a reference anchor pose from the set of anchor poses,
       wherein the set of anchor poses comprise a first anchor pose and a second anchor pose, wherein the selecting selection comprises switching the reference anchor pose from the first anchor pose to the second anchor pose in response to the viewer poses meeting a criterion;

determining a first render pose in the scene for a current viewer pose of the viewer poses, wherein the first render pose is determined relative to the reference anchor pose;

retrieving a first three-dimensional image data for the reference anchor pose;

synthesizing an image for the first render pose in response to the first three dimensional image data;

determining the first render pose from a mapping of the viewer poses to render poses, wherein the mapping depends on which anchor pose of the set of anchor poses is selected as the reference anchor pose, wherein the mapping is a constant linear mapping for a first distance from the render pose to the reference anchor pose, wherein the first distance does not exceed a threshold.

12. The method of claim 11, further comprising mapping a viewer pose value to different render pose values for the first anchor pose, wherein the first anchor pose is selected as the reference anchor pose, wherein the second anchor pose is selected as the reference anchor pose.

13. The method of claim 11, wherein the mapping comprises applying a different offset to the render pose depending on which anchor pose of the set of anchor poses is selected as the reference anchor pose.

14. The method of claim 11, further comprising mapping viewer poses to render poses for the same reference anchor pose such that a change in the viewer poses in a first direction is mapped to a change in the render poses in the first direction.

15. A computer program stored on a non-transitory medium, wherein the computer program when executed on a processor performs the method claim 11.

16. An apparatus for generating images of a scene, the apparatus comprising:

a memory circuit, wherein the memory circuit is arranged to store a set of anchor poses for the scene;

a receiver circuit, wherein the receiver circuit is arranged to receive viewer poses of a viewer;

a selector circuit, wherein the selector circuit is arranged to select a reference anchor pose from the set of anchor poses;

a render pose processor circuit, wherein the render pose processor circuit is arranged to determine a first render pose in the scene for a current viewer pose of the viewer poses;

a retriever circuit, wherein the retriever circuit is arranged to retrieve a first three-dimensional image data for the reference anchor pose; and a synthesizer circuit, wherein the synthesizer circuit is arranged to synthesize an image for the first render pose in response to the first three dimensional image data, wherein the set of anchor poses comprise a first anchor pose and a second anchor pose, wherein the selector circuit is arranged to switch the reference anchor pose from the first anchor pose to the second anchor pose in response to the viewer poses meeting a criterion, wherein the render pose processor circuit is arranged to determine the first render pose from a mapping of viewer poses to render poses, wherein the mapping depends on which anchor pose of the set of anchor poses is selected as the reference anchor pose, wherein the mapping is a constant linear mapping for a first distance from the render pose to the reference anchor pose, wherein the first distance does not exceed a threshold.

17. The apparatus of claim 16, wherein the render pose processor circuit is arranged to map a viewer pose value to different render pose values for the first anchor pose, wherein the first anchor pose is selected as the reference anchor pose, wherein the second anchor pose is selected as the reference anchor pose.

18. The apparatus of claim 16, wherein the mapping comprises applying a different offset to the render pose depending on which anchor pose of the set of anchor poses is selected as the reference anchor pose.

19. The apparatus of claim 16, wherein the render pose processor circuit is arranged to map viewer poses to render poses for the same reference anchor pose such that a change in the viewer poses in a first direction is mapped to a change in the render poses in the first direction.

20. The apparatus of claim 16, wherein the linear mapping has a scale factor of no less than 50% and no more than 150%.

* * * * *